(12) United States Patent
Antinori et al.

(10) Patent No.: US 12,401,653 B2
(45) Date of Patent: Aug. 26, 2025

(54) KEY/VALUE PAIR METADATA AUTHENTICATION FOR DECLARATIVE PROCESS ORCHESTRATION ENVIRONMENTS

(71) Applicant: Red Hat, Inc., Raleigh, NC (US)

(72) Inventors: Paolo Antinori, Milan (IT); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 308 days.

(21) Appl. No.: 18/308,285

(22) Filed: Apr. 27, 2023

(65) Prior Publication Data
US 2024/0364692 A1 Oct. 31, 2024

(51) Int. Cl.
*H04L 9/40* (2022.01)
(52) U.S. Cl.
CPC .......... *H04L 63/102* (2013.01); *H04L 63/104* (2013.01)
(58) Field of Classification Search
CPC .............................. H04L 63/102; H04L 63/104
See application file for complete search history.

(56) References Cited

U.S. PATENT DOCUMENTS

2022/0131865 A1\* 4/2022 Lev Ran ............... H04L 63/102
2023/0104368 A1\* 4/2023 Miriyala ................. G06F 9/547
726/1
2023/0336414 A1\* 10/2023 Miriyala ............. H04L 41/0813
2024/0129161 A1\* 4/2024 Miriyala ............... H04L 41/122
2024/0223454 A1\* 7/2024 Miriyala ................ H04L 63/20

OTHER PUBLICATIONS

Liljenstolpe, Christopher, "Leveraging Service Accounts for Label-based Security," Tigera Blog, https://www.tigera.io/blog/label-based-security-is-great-but-who-watches-the-watchers/, Jan. 31, 2019, 7 pages.
Author Unknown, "Labelling workload clusters," Giant Swarm Documentation, https://docs.giantswarm.io/advanced/labelling-workload-clusters/, Feb. 23, 2023, 5 pages.

\* cited by examiner

*Primary Examiner* — Frantz B Jean
(74) *Attorney, Agent, or Firm* — Dority & Manning, P.A.

(57) ABSTRACT

An access control process executing in a declarative container orchestration system receives a notification that the declarative container orchestration system has received a configuration file that identifies a desired future state that includes a creation of an object. Prior to allowing the declarative container orchestration system to create the object, the configuration file is analyzed. Based on the analysis, it is determined that the configuration file includes a key/value pair that is to be associated with the object. The access control process determines that a user associated with the configuration file lacks authorization to request the key/value pair. In response to determining that the user associated with the configuration file lacks authorization to request the key/value pair, the declarative container orchestration system is prevented from creating the desired future state identified in the configuration file.

20 Claims, 3 Drawing Sheets

KEY/VALUE PAIR METADATA AUTHENTICATION FOR DECLARATIVE PROCESS ORCHESTRATION ENVIRONMENTS

BACKGROUND

Declarative process orchestration systems receive, from a user, information that identifies a desired future state of an application and the process orchestration system, over time, causes the application to have the desired future state. Some declarative process orchestration systems implement a metadata mechanism wherein key/value pair metadata may be associated with an object that is managed by the process orchestration system. Such key/value pair metadata may be used to provide certain behavior by the process orchestration system, or extensions of the container orchestration system, depending on the value assigned to the key.

SUMMARY

In one example a method is provided. The method includes receiving, by an access control process executing in a declarative container orchestration system, a first notification that the declarative container orchestration system has received a configuration file that identifies a desired future state that includes the creation of an object. The method further includes prior to allowing the declarative container orchestration system to create the object, analyzing the configuration file. The method further includes based on the analysis, determining that the configuration file includes a key/value pair that is to be associated with the object. The method further includes determining, by the access control process that a user associated with the configuration file lacks authorization to request the key/value pair. The method further includes in response to determining that the user associated with the configuration file lacks authorization to request the key/value pair, preventing the declarative container orchestration system from creating the desired state identified in the configuration file.

In one example a computing device is provided. The computing device includes a memory and a processor device coupled to the memory to receive, by an access control process executing in a declarative container orchestration system, notification that the declarative container orchestration system has received a configuration file that identifies a desired future state that includes the creation of an object. The processor device is further to, prior to allowing the declarative container orchestration system to create the object, analyze the configuration file. The processor device is further to, based on the analysis, determine that the configuration file includes a key/value pair that is to be associated with the object. The processor device is further to determine, by the access control process that a user associated with the configuration file lacks authorization to request the key/value pair. The processor device is further to prevent the declarative container orchestration system from creating the desired state identified in the configuration file.

In another example a non-transitory computer-readable storage medium is provided. The non-transitory computer-readable storage medium includes executable instructions to cause a processor device to receive, by an access control process executing in a declarative container orchestration system, notification that the declarative container orchestration system has received a configuration file that identifies a desired future state that includes the creation of an object. The instructions further cause the processor device to, prior to allowing the declarative container orchestration system to create the object, analyze the configuration file. The instructions further cause the processor device to, based on the analysis, determine that the configuration file includes a key/value pair that is to be associated with the object. The instructions further cause the processor device to determine, by the access control process that a user associated with the configuration file lacks authorization to request the key/value pair. The instructions further cause the processor device to prevent the declarative container orchestration system from creating the desired state identified in the configuration file.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
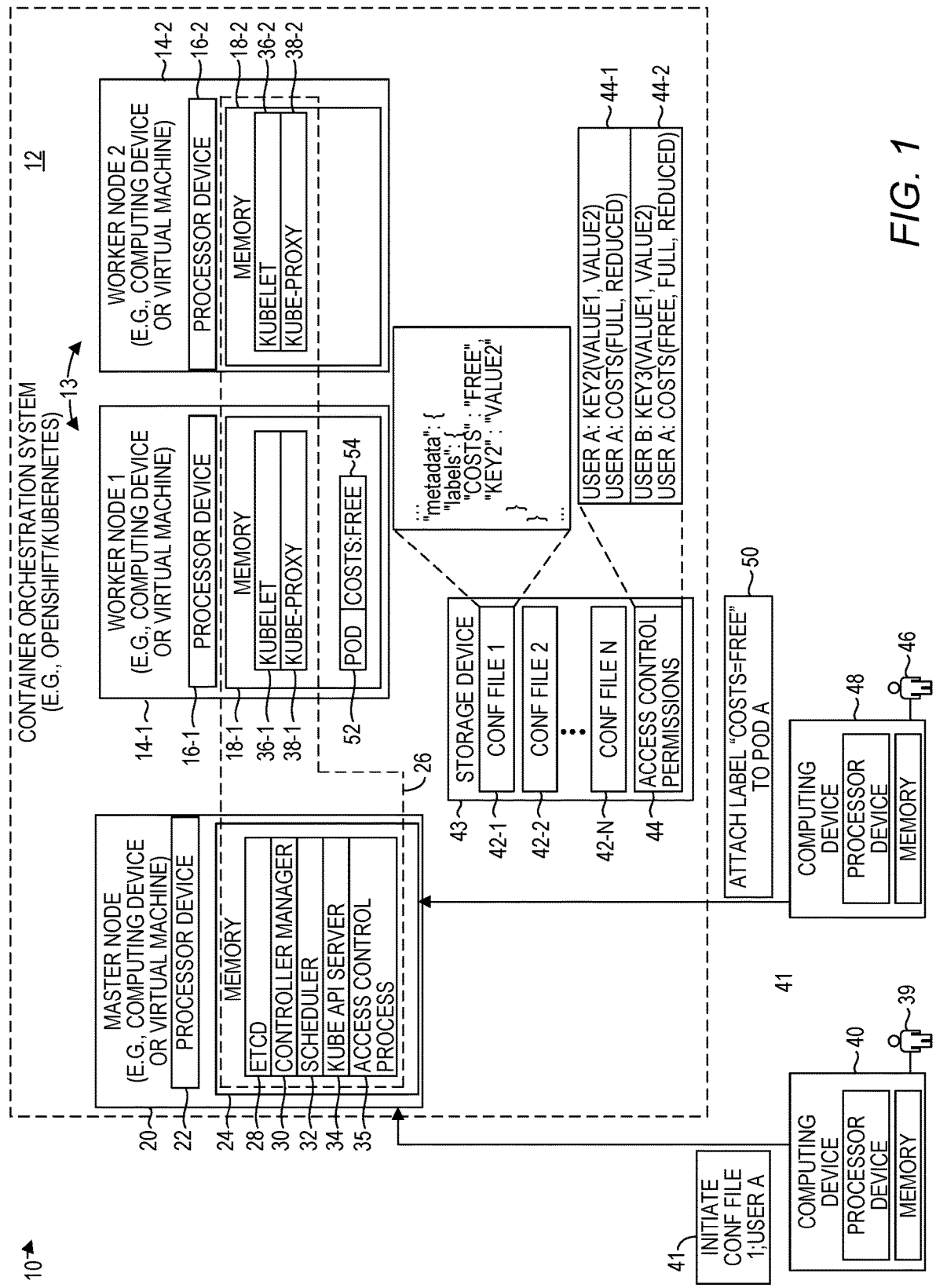
FIG. 1 is a block diagram of an environment suitable for key/value pair metadata authentication for declarative process orchestration environments according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Declarative process orchestration systems receive, from a user, information that identifies a desired future state of an application and the process orchestration system, over time, causes the application to have the desired state. Some declarative process orchestration systems implement a metadata mechanism wherein key/value pair metadata may be associated with an object that is managed by the process orchestration system. Such key/value pair metadata may be used to provide certain behavior by the process orchestration system, or extensions of the container orchestration system, depending on the value assigned to the key.

Kubernetes-based container orchestration systems are an example of a declarative process orchestration system. In a Kubernetes-based container orchestration system (hereinafter referred to as a container orchestration system for the purposes of brevity), such key/value pairs are referred to as labels. A resource in the container orchestration system, such as a container, a pod, a deployment, a replicaset, or the like, may be assigned a key/value pair at generation time. The key/value pair can be queried by the container orchestration system to provide some desired functionality. For example, the container orchestration system may be asked to present a list of all objects that have a particular key/value pair, such as all objects where Label1=Red.

Kubernetes-based container orchestration systems are extensible and allow the generation of control algorithms, referred to as operators, that control the lifecycle of an application. An operator receives requests to cause the application to have a desired state, and the operator attempts to create the desired state on a cluster of nodes. The requests are typically in the form of configuration files that identify the desired future state. The configuration files may identify one or more labels. The operator then causes the generation of resources identified in the request and causes the association of the label with the generated resource. The operator itself, or any other process in the application may implement certain behavior in response to a particular label.

It is typically assumed that the use of a particular label is intentional and used for a desirable purpose. For example, to resolve an issue encountered by a customer, a container orchestration system operator, such as a cloud computing environment provider, may provide the customer a label, such as "COSTS=REDUCED" that, when added to a configuration file, results in reduced charges for the objects that have that label. However, another customer may learn about the label and add the label to their configuration files, essentially defrauding the cloud computing environment provider.

The examples disclosed herein implement key/value pair metadata authentication for declarative process orchestration environments. In one example, an access control process executing in a declarative container orchestration system receives a notification that the declarative container orchestration system has received a configuration file that identifies a desired future state that includes the creation of an object. The access control process analyzes the configuration file prior to allowing the declarative container orchestration system to create the object. Based on the analysis the access control process determines that the configuration file includes a key/value pair that is to be associated with the object. The access control process determines that a user associated with the configuration file lacks authorization to request the key/value pair. The access control process, in response to determining that the user associated with the configuration file lacks authorization to request the key/value pair, prevents the declarative container orchestration system from creating the desired state identified in the configuration file.

FIG. 1 is a block diagram of an environment 10 suitable for key/value pair metadata authentication for declarative process orchestration environments according to one implementation. FIG. 1 includes a declarative container orchestration system 12 that is configured to deploy, manage and scale containerized applications. In some examples the container orchestration system 12 comprises Kubernetes container orchestration system, available at Kubernetes.io, and any Kubernetes-based orchestration system, such as, by way non-limiting example, OpenShift®.

The container orchestration system 12 includes a cluster 13 of worker nodes 14-1 and 14-2 (generally, worker nodes 14), which in this example comprise bare metal machines rather than virtual machines, but in other implementations the cluster of worker nodes 14 may comprise virtual machines implemented on bare metal machines. Although for simplicity and purposes of explanation only two worker nodes 14 are illustrated, in practice, the container orchestration system 12 may include tens, hundreds or even thousands of worker nodes 14 in a single cluster. The worker nodes 14-1, 14-2 comprise computing devices that each have corresponding one or more processor devices 16-1, 16-2 and memories 18-1, 18-2. The container orchestration system 12 includes a master node 20 that includes one or more processor devices 22 and a memory 24.

The container orchestration system 12 implements a control plane 26 that comprises a plurality of control plane components. In this example, the control plane 26 includes an ETCD 28 control plane component that is a distributed key-value store that provides a mechanism for storing data. The control plane 26 includes a controller manager 30 control plane component that monitors the shared state of the cluster 13 and makes changes attempting to move the current state of the cluster 13 to the desired state. The control plane 26 includes a scheduler 32 control plane component that assigns pods to the worker nodes 14. The control plane 26 includes a Kube application programming interface (API) server 34 control plane component that exposes various functions of the container orchestration system 12 to other programs, such as an operator command line interface front end, and the like. In this implementation the control plane 26 includes an access control process 35 that analyzes configuration files that identify a desired state of an application to determine if the configuration files contain key/value pairs. If so, the access control process 35 determines whether the user associated with the configuration file has been authorized to use the key/value pairs.

The control plane 26 comprises control plane components that are distributed across both the master node 20 and the worker nodes 14-1, 14-2. The worker node 14-1 includes a kubelet 36-1 control plane component which serves as a node agent for the worker node 14-1 and responds to requests from control plane components executing on the master node 20. For example, the kubelet 36-1 establishes pods on the worker node 14-1 and causes the initiation of containers on the worker node 14-1 based on decisions of the scheduler 32. The worker node 14-1 includes a kube proxy 38-1 control plane component that facilitates network communications between pods and provides other network services. The worker node 14-2 similarly includes a kubelet 36-2 control plane component and a kube proxy 38-2 control plane component.

In operation, the container orchestration system 12 is provided one or more configuration files that identify a desired state of resources that compose an application, such as pod resources, deployment set resources, replicaset resources, container resources, and the like. The container orchestration system 12 accesses the configuration file(s) and attempts to implement the desired state via the generation of the identified resources on the worker nodes 14.

As discussed above, Kubernetes utilizes a plurality of worker nodes, such as virtual machines and/or bare metal machines, on which pods can be deployed. A pod can include one or more containers. The term "container" as used herein, refers to a running instance of a container image that is initiated by a container runtime, such as CRI-O or containerd. The phrase "container image" as used herein refers to a static package of software comprising one or more layers, the layers including everything needed to run an application (i.e., as a container) that is initiated from the container image, including, for example, one or more of executable files, system tools, system libraries and configuration settings. A Docker® image is an example of a container image.

While for purposes of illustration the examples are disclosed herein in the context of a declarative container orchestration system, the examples are not limited to declarative container orchestration systems and have applicability in any declarative process orchestration system.

The container orchestration system 12 implements metadata referred to as labels that can be attached to resources (i.e., objects) such as a container, a pod, a deployment, a replicaset, or the like A label is a key/value pair. The term "metadata" refers to data about, or related to, a particular resource. For example, a first pod may have a key/value pair of "Label 1=Red", and a second pod may have a key/value pair of "Label 1=Blue". The container orchestration system 12 organizes and maintains the metadata in such a manner that the key/value pair of "Label 1=Red" is associated with the first pod and not the second pod and the key/value pair of "Label 1=Blue" is associated with the second pod and not the first pod.

Labels are intended to be used to specify identifying attributes of objects that are meaningful and relevant to users, but do not directly imply semantics to the core system. Labels can be used to organize and to select subsets of objects. Labels can be attached to objects at creation time and subsequently added and modified at any time. Each object can have a set of key/value labels defined.

In one example illustrated in FIG. 1, a user 39 (user A) interacts with a user computing device 40 to send a request 41 to the control plane 26 to establish a state in the container orchestration system 12 identified in a configuration file 42-1 stored on a storage device 43. The configuration file 42 may comprise, for example, a pod specification that indicates that two pods are to be implemented in the container orchestration system 12 and multiple containers are to be initiated in each of the pods. In one example, the request 41 is received by the controller manager 30. The controller manager 30 sends the request to the access control process 35 prior to initiating the pods and the containers on the worker nodes 14. The access control process 35 analyzes the configuration file 42. The access control process 35 determines that the request is associated with the user A. The determination may be based, by way of non-limiting example, on information included in the request 41 or in the configuration file 42-1.

The access control process 35 determines that the configuration file 42 contains an entry 42-1 that identifies key/value pair authorizations for the user A. The entry 42-1 indicates that user A is authorized to use the "COSTS" key, but is limited to specifying values of "FULL" or "REDUCED", but not "FREE". The access control process 35 then inhibits the control plane 26 from implementing the pods and containers identified in the configuration file 42-1 on the worker nodes 14. For example, the access control process 35 returns a value to the controller manager 30 indicating that the controller manager 30 should disregard the request 41.

In another example, a user 46 (user B) interacts with a computing device 48 to cause a request 50 to be sent to the container orchestration system 12 that requests that an existing object, a pod 52, be given a key/value of "COSTS=FREE" via a suitable command language interface (CLI) command. Prior to executing the command and attaching the key/value pair to the pod 52, the access control process 35 accesses an access control permissions structure 44 that identifies users and key/value pairs the users are authorized to use. An entry 44-2 corresponds to the user B. The entry 44-2 indicates that user B is authorized to use the "COSTS" key, and is authorized to use the value of "FREE." The access control process 35 then allows the control plane 26 to attach metadata 54 comprising the key/value pair "COSTS=FREE" to the pod 52.

In yet another implementation, the access control process 35 periodically analyzes all objects implemented on the worker nodes 14 and determines the key/value pairs attached to each object. For each such key/value pair, the access control process 35 determines, based on the access control permissions structure 44, whether the object has authorization to utilize the attached key/value pair. If not, the access control process 35 may remove the key/value pair, and/or terminate the object. The access control process 35 may also analyze configuration files 42-1-42-N to determine whether the configuration files 52 utilize key/value pairs that the corresponding user has authorization to utilize. If not, the access control process 35 may remove the key/value pair from the configuration file 42-1-42-N.

Upon modifications to the access control permissions structure 44 the access control process 35 may determine if any key/value authorizations have changed, and if so, analyze the key/value pairs associated with all executing objects to determine whether any object contains a key/value pair that is no longer authorized for that object. If so, the access control process 35 may remove the key/value pair, and/or terminate the object. The access control process 35 may also analyze configuration files 42-1-42-N to determine whether the configuration files 52 utilize key/value pairs that the corresponding user has authorization to utilize. If not, the access control process 35 may remove the key/value pair from the configuration file 42-1-42-N.

It is noted that, because the access control process 35 is a component of the master node 20, functionality implemented by the access control process 35 may be attributed to the master node 20 generally. Moreover, in examples where the access control process 35 comprises software instructions that program the processor device 22 to carry out functionality discussed herein, functionality implemented by the access control process 35 may be attributed herein to the processor device 22.

Figure 2:
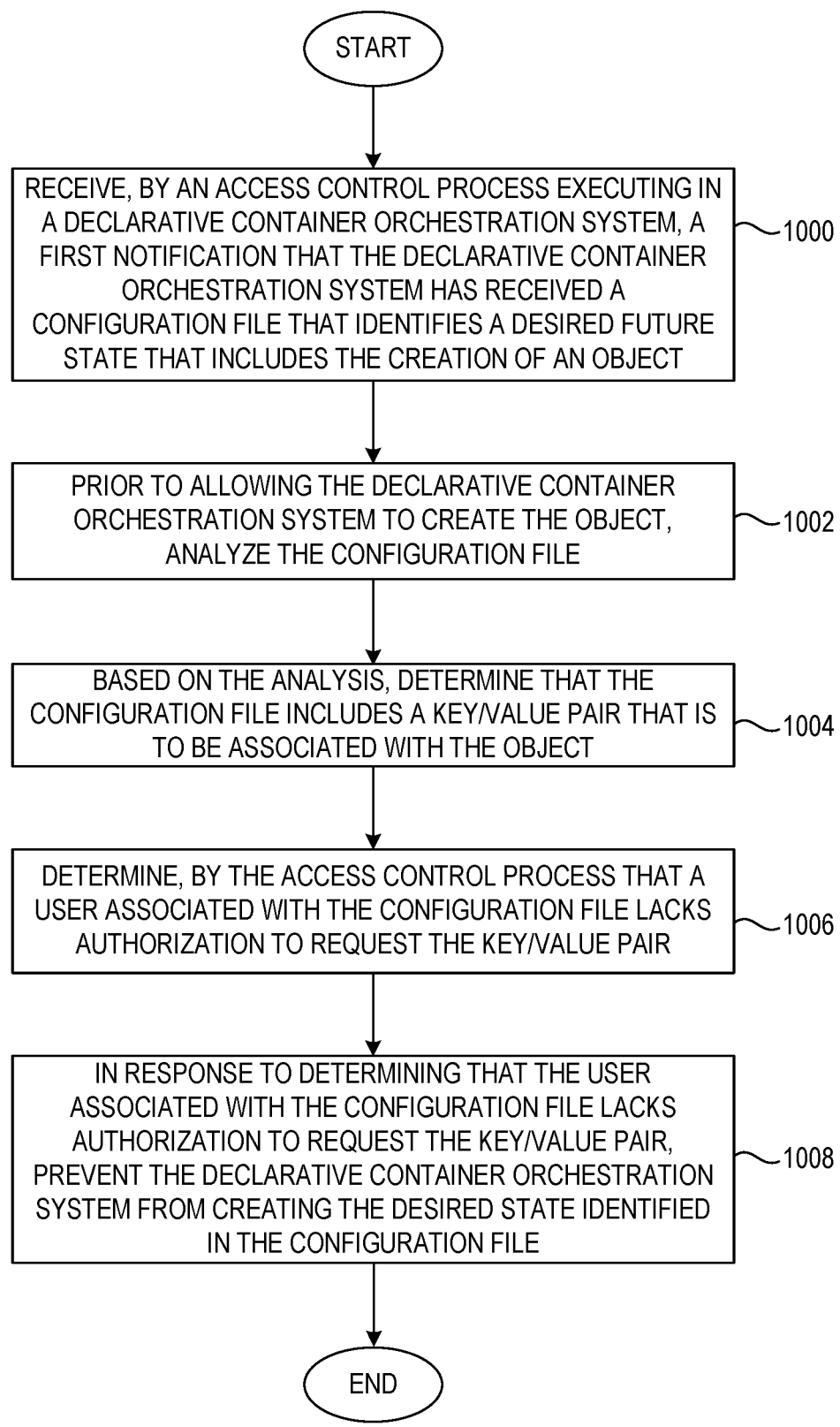
FIG. 2 is a flowchart of a method for key/value pair metadata authentication for declarative process orchestration environments according to one implementation.

FIG. 2 is a flowchart of a method for key/value pair metadata authentication for declarative process orchestration environments according to one implementation. FIG. 2 will be discussed in conjunction with FIG. 1. The master node 20 receives a notification that the declarative container orchestration system 12 has received the configuration file 42 that identifies the desired future state that includes the creation of an object (FIG. 2, block 1000). The master node 20, prior to allowing the declarative container orchestration system 12 to create the object, analyzes the configuration file 42 (FIG. 2, block 1002). The master node 20, based on the analysis, determines that the configuration file 42 includes a key/value pair that is to be associated with the object (FIG. 2, block 1004). The master node 20 determines that a user associated with the configuration file 42 lacks authorization to request the key/value pair (FIG. 2, block 1006). The master node 20, in response to determining that the user associated with the configuration file 42 lacks authorization to request the key/value pair, prevents the declarative container orchestration system 12 from creating the desired state identified in the configuration file 42 (FIG. 2, block 1008).

Figure 3:
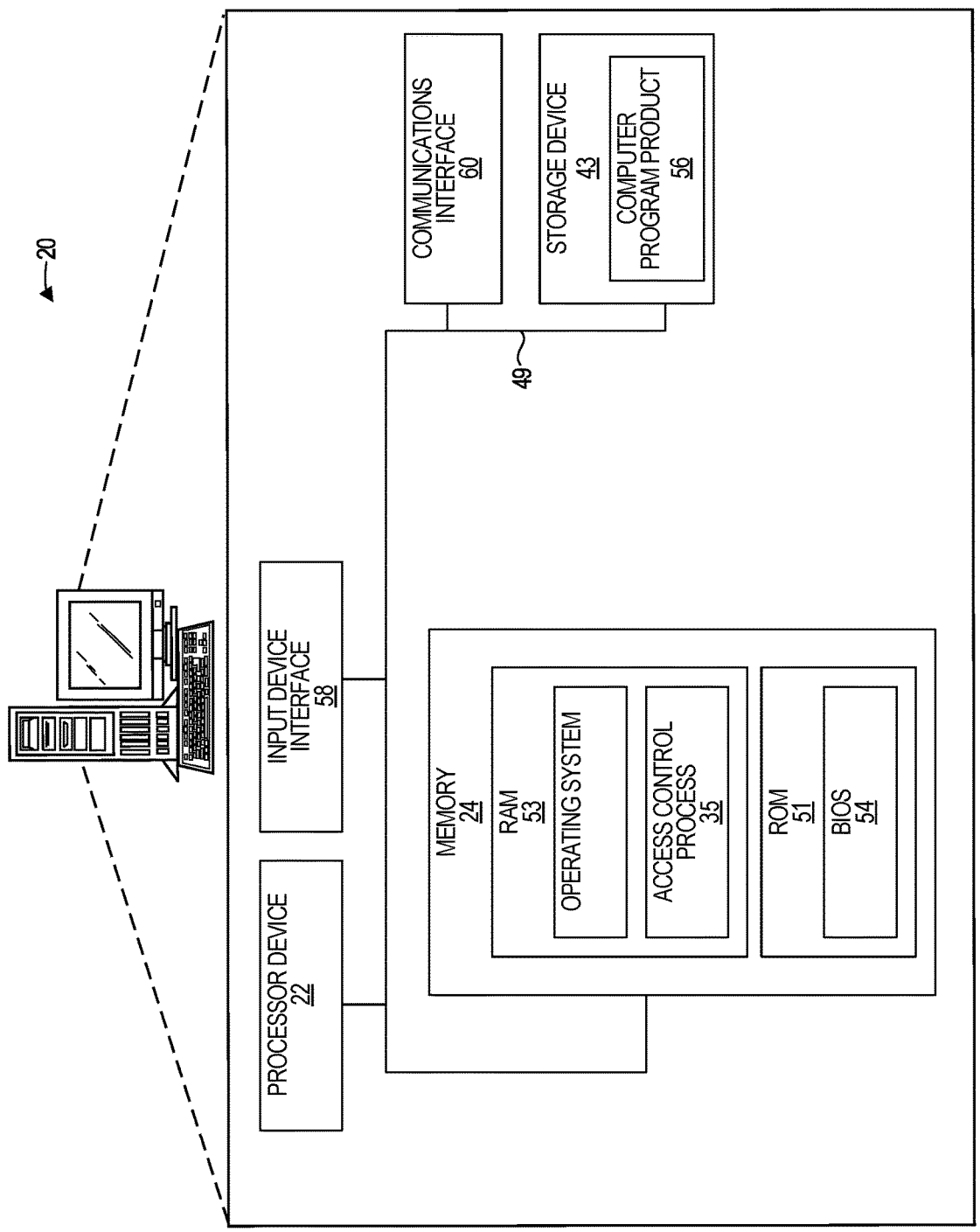
FIG. 3 is a block diagram of a computing system suitable for implementing key/value pair metadata authentication for declarative process orchestration environments according to one implementation.

FIG. 3 is a block diagram of the master node 20 suitable for implementing examples according to one example. The master node 20 may comprise any computing or electronic device capable of including firmware, hardware, and/or executing software instructions to implement the functionality described herein, such as a computer server, a desktop computing device, a laptop computing device, or the like. The master node 20 includes the processor device 22, the system memory 24, and a system bus 49. The system bus 49 provides an interface for system components including, but not limited to, the system memory 24 and the processor device 22. The processor device 22 can be any commercially available or proprietary processor.

The system bus 49 may be any of several types of bus structures that may further interconnect to a memory bus (with or without a memory controller), a peripheral bus, and/or a local bus using any of a variety of commercially available bus architectures. The system memory 24 may include non-volatile memory 51 (e.g., read-only memory (ROM), erasable programmable read-only memory (EPROM), electrically erasable programmable read-only memory (EEPROM), etc.), and volatile memory 53 (e.g., random-access memory (RAM)). A basic input/output system (BIOS) 54 may be stored in the non-volatile memory 51 and can include the basic routines that help to transfer information between elements within the master node 20. The volatile memory 53 may also include a high-speed RAM, such as static RAM, for caching data.

The master node 20 may further include or be coupled to a non-transitory computer-readable storage medium such as the storage device 43, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 43 and other drives associated with computer-readable media and computer-usable media may provide non-volatile storage of data, data structures, computer-executable instructions, and the like.

A number of modules can be stored in the storage device 43 and in the volatile memory 53, including an operating system and one or more program modules, such as the access control process 35, which may implement the functionality described herein in whole or in part. All or a portion of the examples may be implemented as a computer program product 56 stored on a transitory or non-transitory computer-usable or computer-readable storage medium, such as the storage device 43, which includes complex programming instructions, such as complex computer-readable program code, to cause the processor device 22 to carry out the steps described herein. Thus, the computer-readable program code can comprise software instructions for implementing the functionality of the examples described herein when executed on the processor device 22. The processor device 22, in conjunction with the access control process 35 in the volatile memory 53, may serve as a controller, or control system, for the master node 20 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 22 through an input device interface 58 that is coupled to the system bus 49 but can be connected by other interfaces such as a parallel port, an Institute of Electrical and Electronic Engineers (IEEE) 1394 serial port, a Universal Serial Bus (USB) port, an IR interface, and the like. The master node 20 may also include the communications interface 60 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
receiving, by an access control process executing in a declarative container orchestration system, a first notification that the declarative container orchestration system has received a configuration file that identifies a desired future state that includes a creation of an object;
prior to allowing the declarative container orchestration system to create the object, analyzing the configuration file;
based on the analysis, determining that the configuration file includes a key/value pair that is to be associated with the object;
determining, by the access control process that a user associated with the configuration file lacks authorization to request the key/value pair; and
in response to determining that the user associated with the configuration file lacks authorization to request the key/value pair, preventing the declarative container orchestration system from creating the desired future state identified in the configuration file.

2. The method of claim 1 wherein the declarative container orchestration system comprises a cluster of nodes, and wherein the declarative container orchestration system is operable to implement a desired future state one or more nodes of the cluster of nodes.

3. The method of claim 1 wherein determining, by the access control process that the user associated with the configuration file lacks authorization to request the key/value pair further comprises:
determining the user associated with the configuration file; and
accessing access control permissions structure that identifies users and key/value pairs the users are authorized to use.

4. The method of claim 3 wherein determining, by the access control process that the user associated with the configuration file lacks authorization to request the key/value pair further comprises determining, based on the access control permissions structure, that the user is authorized to use the key but not the value.

5. The method of claim 3 wherein determining, by the access control process that the user associated with the configuration file lacks authorization to request the key/value pair further comprises determining, based on the access control permissions structure, that the user is not authorized to use the key.

6. The method of claim 1 wherein the declarative container orchestration system comprises a Kubernetes-based container orchestration system.

7. The method of claim 1 further comprising:
receiving, by the access control process, a second notification that the declarative container orchestration system has received a configuration file that identifies a desired future state that includes a creation of an object;
prior to allowing the declarative container orchestration system to create the object, analyzing the configuration file;
based on the analysis, determining that the configuration file includes a key/value pair that is to be associated with the object;
determining, by the access control process that a user associated with the configuration file has authorization to request the key/value pair; and
in response to determining that the user associated with the configuration file lacks authorization to request the key/value pair, allowing the declarative container orchestration system to create the desired future state identified in the configuration file.

8. A computing device, comprising:
a memory; and
a processor device coupled to the memory to:
receive, by an access control process executing in a declarative container orchestration system, notification that the declarative container orchestration system has received a configuration file that identifies a desired future state that includes a creation of an object;
prior to allowing the declarative container orchestration system to create the object, analyze the configuration file;
based on the analysis, determine that the configuration file includes a key/value pair that is to be associated with the object;
determine, by the access control process that a user associated with the configuration file lacks authorization to request the key/value pair; and
prevent the declarative container orchestration system from creating the desired future state identified in the configuration file.

9. The computing device of claim 8 wherein the declarative container orchestration system comprises a cluster of nodes, and wherein the declarative container orchestration system is operable to implement a desired future state one or more nodes of the cluster of nodes.

10. The computing device of claim 8 wherein to determine, by the access control process that the user associated with the configuration file lacks authorization to request the key/value pair, the processor device is further to:
determine the user associated with the configuration file; and
access an access control permissions structure that identifies users and key/value pairs the users are authorized to use.

11. The computing device of claim 10 wherein to determine, by the access control process that the user associated with the configuration file lacks authorization to request the key/value pair, the processor device is further to determine, based on the access control permissions structure, that the user is authorized to use the key but not the value.

12. The computing device of claim 10 wherein to determine, by the access control process that the user associated with the configuration file lacks authorization to request the key/value pair further, the processor device is further to determine, based on the access control permissions structure, that the user is not authorized to use the key.

13. The computing device of claim 10 wherein the declarative container orchestration system comprises a Kubernetes-based container orchestration system.

14. The computing device of claim 10 wherein the processor device is further to:
receive, by the access control process, a second notification that the declarative container orchestration system has received a configuration file that identifies a desired future state that includes a creation of an object;
prior to allowing the declarative container orchestration system to create the object, analyze the configuration file;
based on the analysis, determine that the configuration file includes a key/value pair that is to be associated with the object;
determine, by the access control process that a user associated with the configuration file has authorization to request the key/value pair; and
in response to determining that the user associated with the configuration file lacks authorization to request the key/value pair, allow the declarative container orchestration system to create the desired future state identified in the configuration file.

15. A non-transitory computer-readable storage medium that includes executable instructions to cause a processor device to:
receive, by an access control process executing in a declarative container orchestration system, notification that the declarative container orchestration system has received a configuration file that identifies a desired future state that includes a creation of an object;
prior to allowing the declarative container orchestration system to create the object, analyze the configuration file;
based on the analysis, determine that the configuration file includes a key/value pair that is to be associated with the object;
determine, by the access control process that a user associated with the configuration file lacks authorization to request the key/value pair; and
prevent the declarative container orchestration system from creating the desired future state identified in the configuration file.

16. The non-transitory computer-readable storage medium of claim 15 wherein the declarative container orchestration system comprises a cluster of nodes, and wherein the declarative container orchestration system is operable to implement a desired future state one or more nodes of the cluster of nodes.

17. The non-transitory computer-readable storage medium of claim 15 wherein to determine, by the access control process that the user associated with the configuration file lacks authorization to request the key/value pair, the instructions further cause the processor device to:
determine the user associated with the configuration file; and
access an access control permissions structure that identifies users and key/value pairs the users are authorized to use.

18. The non-transitory computer-readable storage medium of claim 17 wherein to determine, by the access control process that the user associated with the configuration file lacks authorization to request the key/value pair, the instructions further cause the processor device to determine, based on the access control permissions structure, that the user is authorized to use the key but not the value.

19. The non-transitory computer-readable storage medium of claim 17 wherein to determine, by the access control process that the user associated with the configuration file lacks authorization to request the key/value pair further, the instructions further cause the processor device to, based on the access control permissions structure, that the user is not authorized to use the key.

20. The non-transitory computer-readable storage medium of claim 15 wherein the declarative container orchestration system comprises a Kubernetes-based container orchestration system.

* * * * *